(12) United States Patent
Sexton (10) Patent No.: US 9,759,264 B1
(45) Date of Patent: Sep. 12, 2017

(54) METHODS OF MANUFACTURING DURABILITY-ENHANCED BEARING ASSEMBLIES

(71) Applicant: US SYNTHETIC CORPORATION, Orem, UT (US)

(72) Inventor: Timothy N. Sexton, Bettendorf, IA (US)

(73) Assignee: US SYNTHETIC CORPORATION, Orem, UT (US)

( * ) Notice: Subject to any disclaimer, the term of this patent is extended or adjusted under 35 U.S.C. 154(b) by 451 days.

(21) Appl. No.: 14/333,045

(22) Filed: Jul. 16, 2014

Related U.S. Application Data (62) Division of application No. 13/281,681, filed on Oct. 26, 2011, now Pat. No. 8,814,434.

(51) Int. Cl.
*F16C 43/02* (2006.01)
*F16C 17/00* (2006.01)

(52) U.S. Cl.
CPC .............. *F16C 43/02* (2013.01); *F16C 17/00* (2013.01)

(58) Field of Classification Search
CPC .......... F16C 33/00; F16C 33/24; F16C 43/02; F16C 17/00
See application file for complete search history.

(56) References Cited

U.S. PATENT DOCUMENTS

| | | | |
|---|---|---|---|
| 4,029,368 A | 6/1977 | Tschirky et al. | |
| 4,141,605 A | 2/1979 | Riordan et al. | |
| 4,190,301 A | 2/1980 | Lachonius et al. | |
| 4,560,014 A | 12/1985 | Geczy | |
| 4,708,496 A | 11/1987 | McPherson | |
| 4,756,631 A | 7/1988 | Jones | |
| 5,161,898 A | 11/1992 | Drake | |
| 5,364,192 A | 11/1994 | Damm et al. | |
| 5,716,143 A | 2/1998 | Browne et al. | |
| 7,866,418 B2 | 1/2011 | Bertagnolli et al. | |
| 2010/0226759 A1 | 9/2010 | Cooley et al. | |

OTHER PUBLICATIONS

U.S. Appl. No. 11/545,929, filed Oct. 10, 2006, Bertagnolli et al.
U.S. Appl. No. 13/281,681, filed Oct. 26, 2011, Sexton.
U.S. Appl. No. 13/281,681, Aug. 9, 2013, Office Action.
U.S. Appl. No. 13/281,681, Jan. 7, 2014, Office Action.
U.S. Appl. No. 13/281,681, Apr. 17, 2014, Notice of Allowance.
Issue Notification for U.S. Appl. No. 13/281,681 mailed Aug. 6, 2014.

*Primary Examiner* — Jessee Roe (74) *Attorney, Agent, or Firm* — Dorsey & Whitney LLP (57) ABSTRACT

Durability-enhanced bearing assemblies, apparatuses, and motor assemblies using the same are disclosed. In an embodiment, a bearing assembly may include a plurality of superhard bearing elements distributed circumferentially about an axis. Each of the superhard bearing elements includes a bearing surface. The bearing assembly may further include a support ring structure that carries the plurality of superhard bearing elements. The support ring structure may have a first portion that exhibits a first yield strength and a second portion that exhibits a second yield strength. The first yield strength of the first portion may be greater than the second yield strength of the second portion.

16 Claims, 8 Drawing Sheets

METHODS OF MANUFACTURING DURABILITY-ENHANCED BEARING ASSEMBLIES

CROSS-REFERENCE TO RELATED APPLICATIONS

This application is a divisional of U.S. application Ser. No. 13/281,681 filed on 26 Oct. 2011, the disclosure of which is incorporated herein, in its entirety, by this reference.

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. A pair of thrust-bearing apparatuses also can be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a larger or greater depth within the earth.

Each thrust-bearing apparatus includes a stator that does not rotate relative to the motor housing and a rotor that is attached to the output shaft and rotates with the output shaft. The stator and rotor each include a plurality of bearing elements that may be fabricated from polycrystalline diamond compacts ("PDCs") that provide diamond bearing surfaces that bear against each other during use.

In operation, high-pressure drilling fluid may be circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated, which is commonly referred to as "on-bottom thrust" that tends to compress and is carried, at least in part, by one of the thrust-bearing apparatuses. Fluid flow through the power section may cause what is commonly referred to as "off-bottom thrust," which is carried, at least in part, by the other thrust-bearing apparatus. The on-bottom and off-bottom thrust carried by the thrust-bearing apparatuses can be extremely large.

The operational lifetime of a subterranean drilling system can often be determined by the useful life of the thrust-bearing apparatus. Therefore, manufacturers and users of thrust-bearing apparatuses continue to attempt to improve their operational lifetime.

SUMMARY

Various embodiments of the invention relate to durability-enhanced bearing assemblies, apparatuses and motor assemblies that include support ring structures having one or more portions configured to improve the durability thereof. In an embodiment, a bearing assembly may include a plurality of superhard bearing elements distributed circumferentially about an axis. Each of the superhard bearing elements include a bearing surface. The bearing assembly may further include a support ring structure that carries the plurality of superhard bearing elements. The support ring structure may include a first portion that exhibits a first yield strength and a second portion that exhibits a second yield strength. The first yield strength of the first portion may be greater than the second yield strength of the second portion.

In an embodiment, the first portion may also exhibit a first fracture toughness and the second portion may also exhibit a second fracture toughness that is greater than the first fracture toughness. In an embodiment, the first portion may comprise a carrier and the second portion may comprise a support ring, the support ring being at least partially received within the carrier. In an embodiment, the first portion and the second portion may be integral with each other. In an embodiment, the first portion may comprise a clamping portion positioned and configured to undergo clamping loads from one or more clamping members. In an embodiment, the second portion may comprise a bearing portion positioned and configured to receive and support the plurality of superhard bearing elements.

In an embodiment, a bearing apparatus includes two bearing assemblies. At least one of the two bearing assemblies may be configured as any of the disclosed bearing assembly embodiments that include a support ring structure having a first portion including a hard, high yield strength material and a second portion including a fracture tough, lower yield strength material.

In an embodiment, a method for manufacturing a bearing assembly may include brazing a plurality of superhard bearing elements to a support ring structure having a first portion and a second portion. The method may include controlling the temperature of at least the first portion of the support ring structure during the brazing process to produce a hard, high yield strength material in the first portion. The method may also include manipulating the temperature of at least the second portion of the support ring structure during the brazing process to produce a relatively tougher, lower yield strength material in the second portion.

Other embodiments include downhole motors for use in drilling systems and subterranean drilling systems that may utilize any of the disclosed bearing apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Figure 1A:
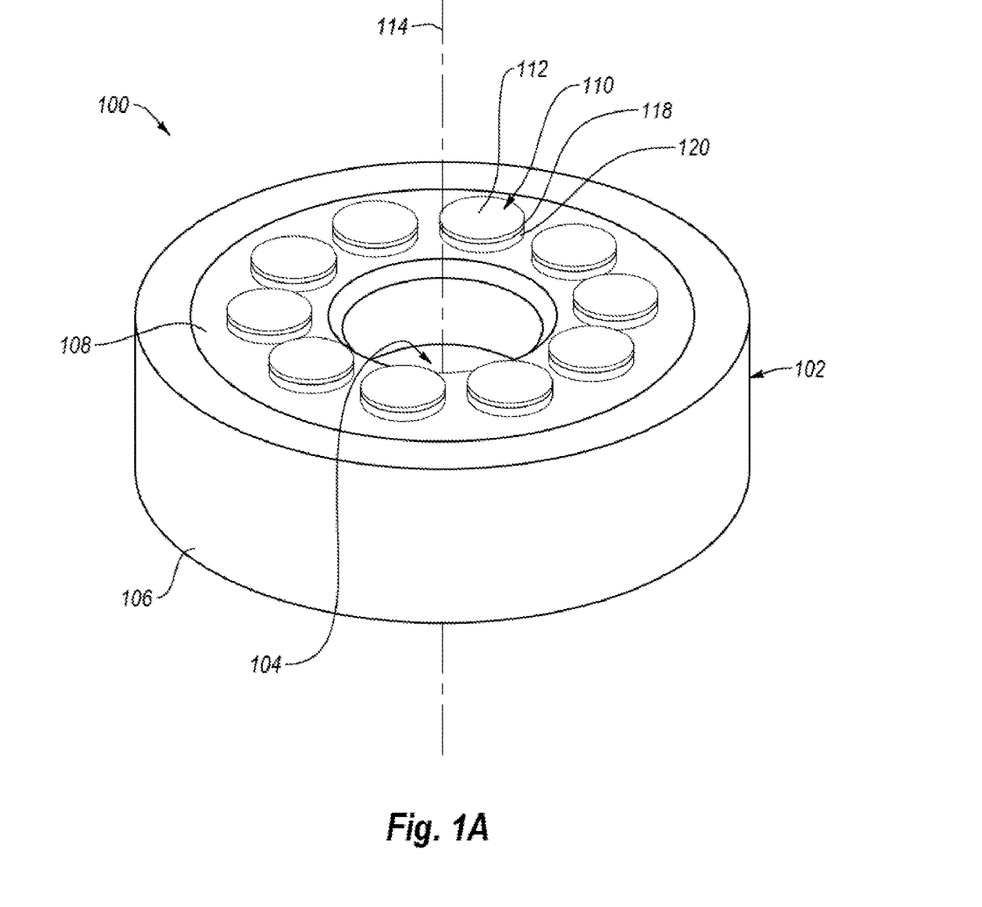
FIG. 1A is an isometric view of a thrust-bearing assembly according to an embodiment.
Figure 1B:
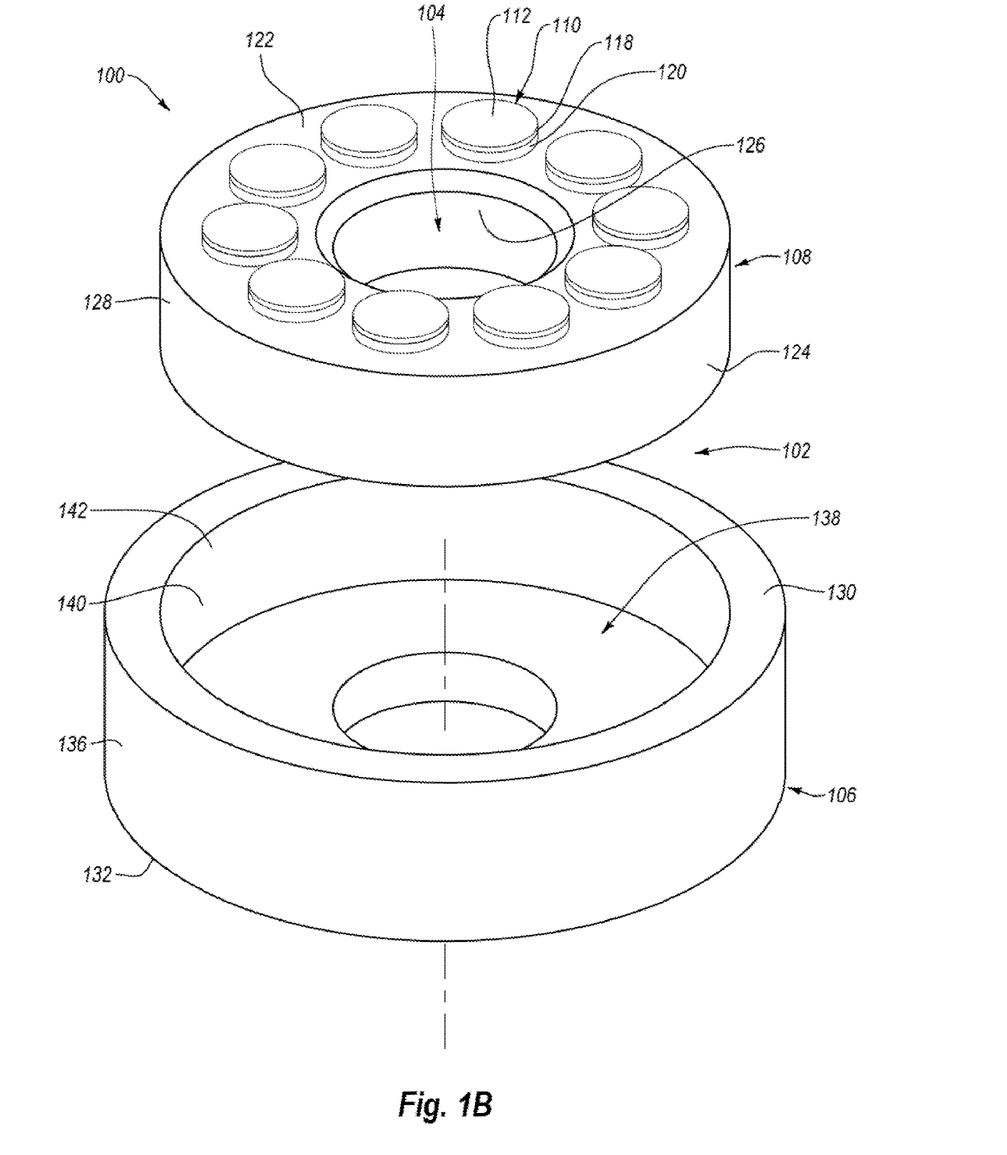
FIG. 1B is an exploded isometric view of the thrust-bearing assembly shown in FIG. 1A.
Figure 1C:
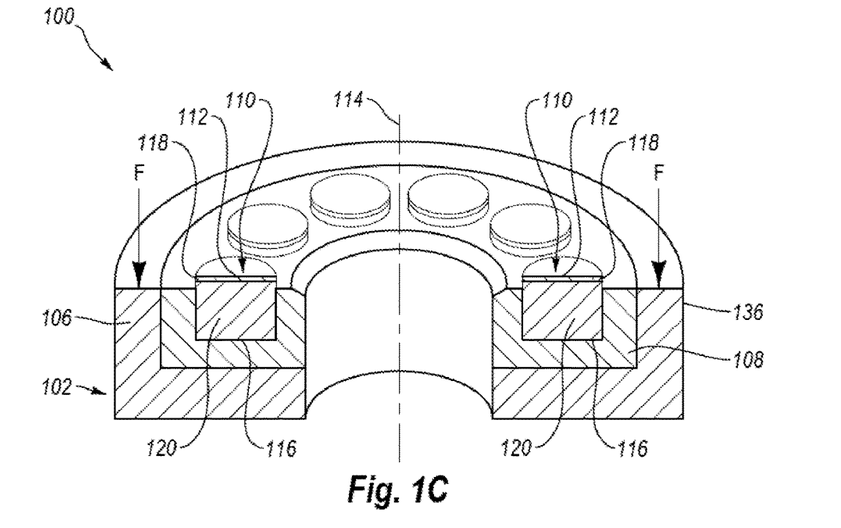
FIG. 1C is a cross-sectional view of the thrust-bearing assembly shown in FIG. 1A.

Embodiments of the invention relate to durability-enhanced bearing assemblies, apparatuses and motor assemblies that include support ring structures configured to extend the useful life of the bearing assemblies, apparatuses and motor assemblies. FIGS. 1A-1C are isometric, exploded, and cross-sectional views of a thrust-bearing assembly 100 according to an embodiment. The thrust-bearing assembly 100 may form a stator or a rotor of a thrust-bearing apparatus used in a subterranean drilling system.

In the illustrated embodiment, the thrust-bearing assembly 100 may include a support ring structure 102 that defines an opening 104 through which a shaft (not shown) of, for example, a downhole drilling motor may extend. As shown in FIG. 1A, the support ring structure 102 may comprise a two-ring assembly having a carrier 106 and a support ring 108 at least partially received within the carrier 106. In other embodiments, the two-ring assembly of the support ring structure 102 may comprise the carrier 106 at least partially received within the support ring 106. In other embodiments, the support ring structure 102 may include a single ring assembly, a three-ring assembly, a four-ring assembly, or any other number of rings suitable to form a thrust-bearing assembly.

The thrust-bearing assembly 100 further may include a plurality of superhard bearing elements 110 each of which may include a bearing surface 112. The plurality of superhard bearing elements 110 may have a variety of shapes, including cylindrical, non-cylindrical, oval, triangular, or any other regular or irregular geometric shape. The superhard bearing elements 110 are illustrated in FIG. 1A being distributed circumferentially about a thrust axis 114 along which a thrust force may be generally directed during use. As illustrated in FIGS. 1A and 1C, the superhard bearing elements 110 may be partially disposed in corresponding recesses 116 of the support ring 108 of the support ring structure 102 and secured partially therein via brazing, press-fitting, fastening with a fastener, or another suitable technique. Suitable braze alloys for brazing the superhard bearing elements 110 to the support ring structure 108 include gold, silver, copper, or titanium alloys. For example, suitable braze alloys may include gold-tantalum alloys, silver-copper alloys, silver-copper-titanium alloys, combinations thereof, or other suitable braze alloys.

While the support ring 108 is illustrated having only one row of recesses 116, two rows, three rows, or any number of rows of recesses 116 may be employed in other embodiments. As used herein, a superhard bearing element is a bearing element including a bearing surface that is made from a material exhibiting a hardness that is at least as hard as tungsten carbide.

In any of the embodiments disclosed herein, the superhard bearing elements 110 may be made from one or more different superhard materials, such as polycrystalline diamond, polycrystalline cubic boron nitride, silicon carbide, tungsten carbide, or any combination of the foregoing superhard materials. For example, a superhard table 118 (shown in FIG. 1C) may be formed from polycrystalline diamond and a substrate 120 (shown in FIG. 1C) may be formed from cobalt-cemented tungsten carbide. Furthermore, in any of the embodiments disclosed herein, the polycrystalline diamond table may be leached to at least partially or substantially completely remove a metal-solvent catalyst (e.g., cobalt, iron, nickel, or alloys thereof) that was used to initially sinter precursor diamond particles that form the polycrystalline diamond. In another embodiment, an infiltrant used to re-infiltrate a preformed leached polycrystalline diamond table may be at least partially leached or otherwise removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond or an infiltrant used to re-infiltrate a preformed leached polycrystalline diamond table. Additionally, in any of the embodiments disclosed herein, the superhard bearing elements 110 may be substrateless and formed from a polycrystalline diamond body that is at least partially or fully leached to remove a metal-solvent catalyst initially used to sinter the polycrystalline diamond body. Suitable manufacturing techniques for fabricating polycrystalline diamond and polycrystalline diamond compacts that may be used as superhard bearing elements in the disclosed embodiments are disclosed in U.S. Pat. No. 7,866,418 issued on 11 Jan. 2011, the disclosure of which is incorporated herein, in its entirety, by this reference. Additionally, in some embodiments, the superhard table 118 may be brazed to the substrate 120 in a high-pressure/high-temperature ("HPHT") process or other non-HPHT processes. For example, suitable brazing techniques are disclosed in U.S. application Ser. No. 11/545,929 filed on 10 Oct. 2006, the disclosure of which is incorporated herein, in its entirety, by this reference.

The superhard bearing elements 110 may be pre-machined to tolerances and mounted in the support ring 108 and/or mounted to the support ring 108 and the bearing surfaces 112 thereof and planarized (e.g., by lapping and/or grinding) so that the bearing surfaces 112 are substantially coplanar. Optionally, one or more of the superhard bearing elements 110 may exhibit a peripherally extending edge chamfer. However, in other embodiments, the peripherally extending edge chamfer may be omitted.

FIG. 1B is an exploded isometric view of the thrust-bearing assembly 100. As shown, the support ring 108 may be generally cylindrical (or other suitable geometry) and at least partially define the opening 104. The support ring 108 may include an upper surface 122, a lower surface 124, an inner surface 126, and an outer surface 128. The outer surface 128 of the support ring 108 may be substantially parallel to the axis 114. In other embodiments, the outer surface 128 of the support ring 108 may be substantially non-parallel to axis 114.

The carrier 106 may be generally annular or cylindrical and at least partially define the opening 104. The carrier 106 may include an upper surface 130, a lower surface 132, and an outer surface 136. The carrier 106 may also include a support ring recess 138 defined at least partially by a lower base portion 140 and at least one side wall 142 extending between the lower base portion 140 and the upper surface 130 of the carrier 106. The support ring recess 138 may be configured to receive the support ring 108. The support ring recess 138 may have any geometric shape suitable to correspond to the configuration and/or shape of the support ring 108. In an embodiment, the support ring 108 may be positioned within the support ring recess 138 such that the outer surface 128 of the support ring 108 is adjacent to the side wall 142 of the support ring recess 138 and the lower surface 124 of the support ring 108 is adjacent to the base portion 140 of the support ring recess 138. The side wall 142 of the support ring recess 138 may be configured to correspond to the outer surface 128 of the support ring 108. The lower base portion 140 of the support ring recess 138 may be configured to correspond to the lower surface 124 of the support ring 108.

In an embodiment, the support ring 108 may be secured within the support ring recess 138 via brazing, welding, threadedly attaching, press-fitting, fastening with a fastener, a locking mechanism, combinations of the foregoing, or another suitable technique. In addition, the side wall 142 of the support ring recess 138 may include interlocking/friction features configured to further secure the support ring 108 within the support ring recess 138. For example, the side wall 142 may include nubs configured to enhance an interference fit of the support ring 108 within the support ring recess 138. In another embodiment, the support ring 108 may be shrink-fit within the support ring recess 138 of the carrier 106 or formed within the support ring recess 138 of the carrier 106. In another embodiment, the outer surface 128 and/or lower surface 124 of the support ring 108 may include interlocking features configured to correspond to complementary features formed in the support ring recess 138 to selectively secure the inner support ring 108 at least partially within the support ring recess 138 of the carrier 106.

FIG. 1C is a cross-sectional view of the thrust-bearing assembly 100. As described above, the support ring structure 102 may include the support ring 108 at least partially disposed within the carrier 106. Clamping loads F may be exerted on the support ring structure 102 to clamp the thrust-bearing assembly 100 in place during use with a drilling system or other mechanical system. Such clamping loads F on the support ring structure 102 can cause the support ring structure 102 to deform plastically if the clamping loads F cause stresses therein that exceed the yield strength of the support ring structure 102. Yield strength describes a stress at which a material begins to deform plastically. Yield strength is sometimes approximated for uniaxial tension by the 0.2% offset yield strength rule or the Von Mises stress equations for more complex loading conditions.

Figure 1D:
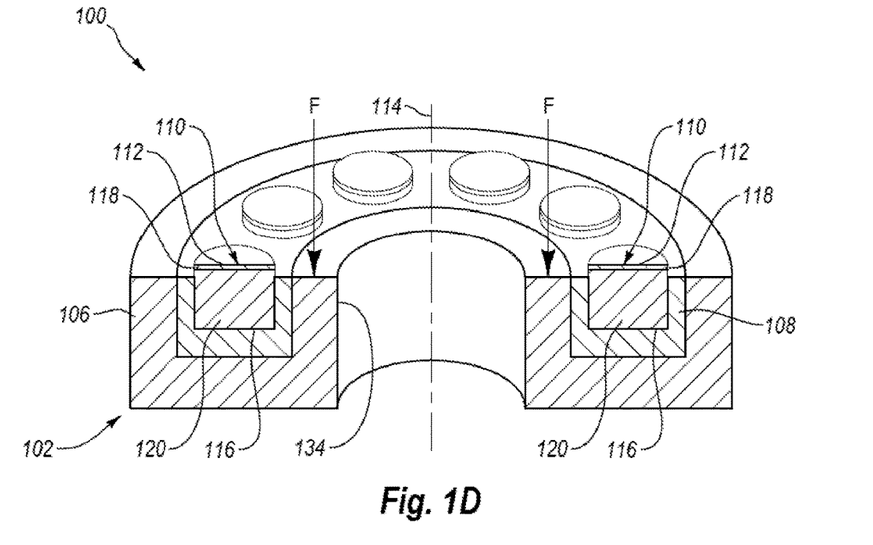
FIG. 1D is a cross-sectional view of a thrust-bearing assembly according to an embodiment.

As illustrated, the support ring structure 102 may include features configured to reduce deformation and/or stress of the thrust-bearing assembly 100. As illustrated, clamping loads F may be concentrated in the carrier 106 of the support ring structure 102 near the outer surface 136. In another embodiment, as illustrated in FIG. 1D, the carrier 106 may be configured such that clamping loads F may be concentrated in the carrier 106 near an inner surface 134 and/or the outer surface 136 of the carrier 106. In an embodiment, the carrier 106 may be formed from a relatively harder, higher yield strength material in comparison to the support ring 108, such as tungsten carbide, a hardened tool steel, an alloy steel (e.g., tempered low-alloy manganese steel or 4340 steel), combinations thereof, or other suitable materials. The material of the carrier 106 may reduce overall deformation of the support ring structure 102 by selectively increasing the yield strength and/or modulus of elasticity of the support ring structure 102 in the portions of the support ring structure 102 where the clamping loads F are likely to be exerted.

In an embodiment, the carrier 106 may exhibit a yield strength of about 100 ksi to 275 ksi; 125 ksi to 250 ksi; 150 ksi to 225 ksi; or 175 ksi to 200 ksi. In other embodiments, the carrier may exhibit greater or lower yield strengths. Such a configuration of the carrier 106 may significantly extend the useful life of the support ring structure 102. However, increasing the strength and/or stiffness of the support ring structure 102 may result in a reduction in fracture toughness, which can lead to cracking of the support ring structure 102 due to friction, thermal loads, mechanical loads, and/or other loads. Fracture toughness describes a material's resistance to fracture or cracking and is commonly measured as $K_{IC}$ value or by Charpy v-notch testing.

In an embodiment, the support ring 108 of the support ring structure 102 may include a relatively tougher, lower yield strength material in comparison to the carrier 106. For example, the support ring 108 may exhibit of yield strength of about 45 ksi to 150 ksi; 60 ksi to 140 ksi; 70 ksi to 130 ksi; or 80 ksi to 120 ksi. In other embodiments, the support ring 108 may exhibit lower or greater yield strength. The tougher, lower yield strength material may include any metal or alloy, such as low carbon steel, alloy steel, stainless steel, aluminum alloys, A36 steel, iron, combinations thereof, or any other suitable lower yield strength materials. During operation of the thrust-bearing assembly 100, friction, thermal loads, mechanical loads, and/or other loads may be concentrated in the support ring 108 of the support ring structure 102 surrounding the superhard bearing elements 110. The tougher, lower yield strength material of the support ring 108 may provide compliance to the support ring structure 102 and/or may increase the fracture toughness of the support ring structure 102 in the portions of the support ring structure 102 where friction, thermal loads, mechanical loads, and/or other loads are likely to occur. Such a configuration of the support ring 108 may significantly extend the useful life of the support ring structure 102. Moreover, the combined configuration of the support ring 108 and the carrier 106 provides a thrust-bearing assembly 100 that may undergo both clamping and operational loads with engineered deformation and/or stress management.

In other embodiments, the carrier 106 and/or the support ring 108 may be configured to possess other specific physical and/or material properties that may prolong the useful life or performance of the thrust-bearing assembly 100. For example, the carrier 106 and/or the support ring 108 may include materials configured to have selected melting points, and/or range of thermal expansion coefficients, electrical resistivity, coefficients of friction, and the like. In other embodiments, the support ring structure 102 may include different portions having the relatively lower yield strength material or higher yield strength material. For example, the support ring 108 may include the higher yield strength material. In other embodiments, the carrier 106 may include the lower yield strength material with distinct locations including the higher yield strength material. In some embodiments, the two-ring assembly may be employ a material with relatively higher thermal conductivity for the support ring 108 compared to the carrier 106 to improve heat transfer from the superhard bearing elements 110, thereby reducing the temperature of the superhard table 118 and increasing the overall capacity of the thrust-bearing assembly 100.

Figure 2A:
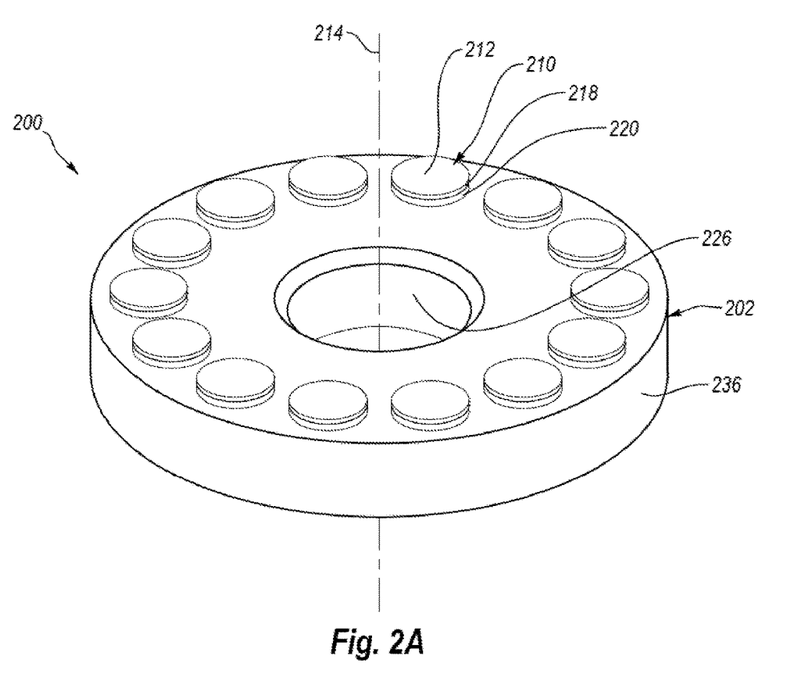
FIG. 2A is an isometric view of a thrust-bearing assembly according to an embodiment.

FIG. 2A is an isometric view of a thrust-bearing assembly 200 according to another embodiment. The thrust-bearing assembly 200 may include a support ring structure 202 extending about a rotation axis 214. A plurality of superhard bearing elements 210 may be distributed circumferentially about the rotation axis 214. At least some of the superhard bearing elements 210 may comprise a superhard table 218 including a bearing surface 212. Each superhard table 218 may be bonded or attached to a corresponding substrate 220 (shown in FIG. 2B). The superhard bearing elements 210 may be made from any of the materials discussed above for the superhard bearing elements 110.

The superhard bearing elements 210 may be distributed circumferentially about the rotation axis 214 in corresponding recesses 216 formed in the support ring structure 202. In an embodiment, the recesses 216 may be formed in an area substantially adjacent to an outer surface 236 of the support ring structure 202. Such a configuration may allow for clamping members to be connected to the support ring structure 202 in an area adjacent an inner surface 226 of the support ring structure 202. In another embodiment, the recesses 216 may be formed in the area substantially adjacent the inner surface 226 of the support ring structure 202. The superhard bearing elements 210 may be at least partially disposed in the recesses 216 and affixed thereto via brazing, threadedly attaching, press-fitting, fastening with a fastener, combinations of the foregoing, or another suitable technique.

Figure 2B:
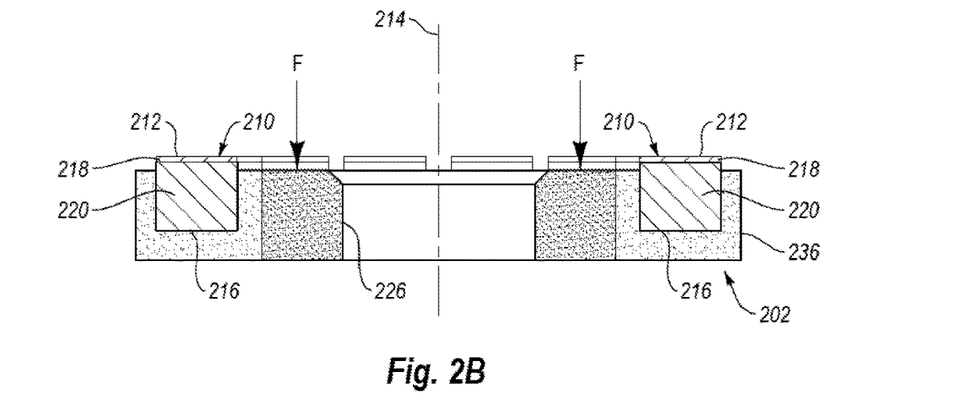
FIG. 2B is a cross-sectional view of the thrust-bearing assembly shown in FIG. 2A.
Figure 2C:
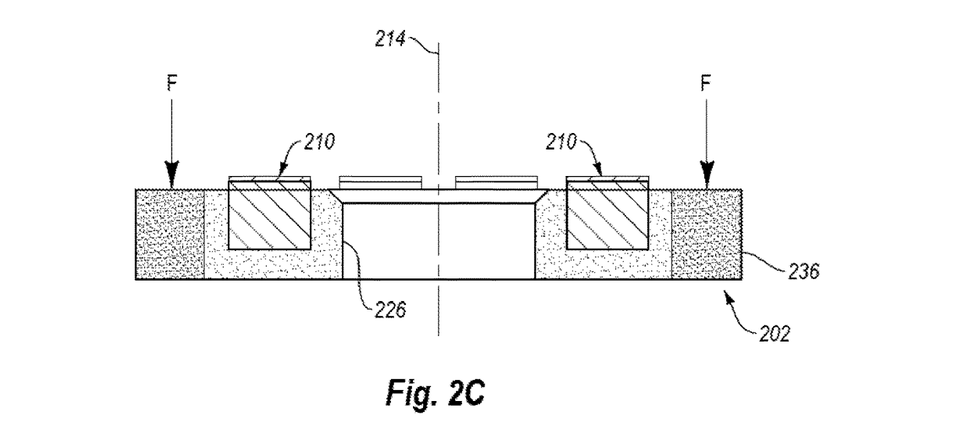
FIG. 2C is a cross-sectional view of a thrust-bearing assembly according to another embodiment.

FIG. 2B is a cross-sectional view of the thrust bearing assembly 200. As shown, clamping loads F may be exerted in a clamping portion of the support ring structure 202 substantially adjacent the inner surface 226 to clamp the thrust-bearing assembly 200 in place during use with a drilling system or other mechanical system. In addition to the clamping loads F, the support ring structure 202 may also experience thermal loads, mechanical loads, combinations thereof, or other operational loads in a bearing portion of the support ring structure 202 substantially adjacent the outer surface 236 surrounding the superhard bearing elements 210. In other embodiments, the clamping portion of the support ring structure 202 may be positioned substantially adjacent the outer surface 236 or at other locations on the support ring structure 202. Similarly, the bearing portion of the support ring structure 202 may be positioned substantially adjacent the inner surface 226 or at other locations on the support ring structure 202. For example, as shown in FIG. 2C, the support ring structure 202 may configured such that the clamping loads F may be exerted in a clamping portion of the support ring structure 202 substantially adjacent the outer surface 236 to clamp the thrust-bearing assembly 200 in place during use. Also shown in FIG. 2C, a bearing portion including the superhard bearing elements 210 may be substantially adjacent the inner surface 226 of the support ring structure 202.

Referring again to FIG. 2B, in an embodiment, the support ring structure 202 of the thrust-bearing assembly 200 may include different portions configured to reduce deformation and/or cracking of the support ring structure 202. For example, the support ring structure 202 may be treated and/or manufactured to exhibit a higher yield strength and/or greater hardness in the clamping portion of the support ring structure 202 than the bearing portion. The support ring structure 202 may also be treated to exhibit a greater fracture toughness and/or lower yield strength in the bearing portion of the support ring structure 202 than the clamping portion. In other embodiments, the clamping portion and/or bearing portion of the support ring structure 202 may be treated and/or manufactured to exhibit other physical and/or material properties such as hardness, melting points, thermal expansion coefficients, electrical resistivity, coefficients of friction, and the like. Treatments and/or manufacturing methods of the support ring structure 202 may include heat-treatments, surface treatments, nitriding, plasma treatments, chemical treatments, powder metallurgy, metal injection molding, combinations thereof, or other treatments and/or manufacturing methods.

In an embodiment, the support ring structure 202 may be heat-treated using an induction heating machine to produce a hard, high yield strength material in the clamping portion of the support ring structure 202 and a relatively tougher, lower yield strength material in the bearing portion of the support ring structure 202. For example, the support ring structure 202 may be made from any metal or alloy (e.g., an alloy steel, such as 4340) or other suitable alloy (e.g., another high-strength carbon or alloy steel). The clamping portion of the support ring structure 202 may be heated with the induction heating machine from about two (2) minutes to about ten (10) minutes (e.g., about 2 to about 3 minutes) or until the clamping portion of the support ring structure 202 is substantially austenitized (e.g., changes its microstructure from ferrite and iron carbide to austenite). As the clamping portion is heated, the temperature of the bearing portion of the support ring structure 202 is maintained at a substantially lower temperature. In an embodiment, the clamping portion of the support ring structure 202 may be substantially austenitized when heated to a temperature of about 1525° F. to about 1650° F. In other embodiments, the clamping portion may be substantially austenitized when heated to other temperatures.

For example, when the clamping portion is located along an outer periphery of the support ring structure 202, the coil of the induction heating machine may extend about the outer surface 236 of the support ring structure 202 to heat the clamping portion to a greater temperature than the bearing portion of the support ring structure 202. When the clamping portion is located along an inner periphery of the support ring structure 202, the coil of the induction heating machine may be inserted in the opening defined by the inner surface 226 of the support ring structure 202 to heat the clamping portion to a greater temperature than the bearing portion of the support ring structure 202.

The support ring structure 202 may then be cooled rapidly to simulate a quenching process. In other embodiments, only the clamping portion of the support ring structure may be cooled rapidly. As the austenized steel of the clamping portion of the support ring structure 202 cools, martensite may start to form as the temperature of the austenitized steel reaches a martensite transformation start temperature. The martensite phase exhibits a relatively higher yield strength and hardness than other steel microstructures, such as pearlite or tempered martensite. In an embodiment, the martensite transformation start temperature of the clamping portion may be about 275° F. to about 725° F. In other embodiments, the martensite transformation start temperature of the clamping portion may be other temperatures.

As the temperature continues to be lowered during cooling, more and more of the austenite in the clamping portions of the support ring structure 202 may be transformed into martensite until the clamping portion reaches a martensite finish temperature. In an embodiment, the martensite finish temperature of the clamping portion may be about 175° F. to 550° F. In other embodiments, the martensite finish temperature of the clamping portion may be other temperatures. Because more martensite is formed in the clamping portion of the support ring structure 202 than the bearing portion of the support ring structure 202, the clamping portion of the support ring structure 202 may exhibit a greater hardness and higher yield strength than the bearing portion of the support ring structure 202. For example, the clamping portion may exhibit a yield strength of about 200 ksi to 250 ksi and the bearing portion may exhibit a yield strength of about 65 ksi to 125 ksi. In other embodiments, the clamping portion and the bearing portion may exhibit higher or lower yield strengths.

In some embodiments, the hardness and/or yield strength of the clamping portion may not be uniform therein, but may exhibit a gradient that progressively decreases toward the bearing portion. On the other hand, because less of the lower toughness martensite is formed in the bearing portion of the support ring structure 202 than the clamping portion, the bearing portion of the support ring structure 202 may exhibit greater fracture toughness and/or lower yield strength than the clamping portion.

In other embodiments, the support ring structure 202 may then be tempered to increase the toughness of the clamping portion of the support ring structure 202 and form a tempered martensite microstructure by transforming at least some of the martensite in the clamping portion into tempered martensite.

In other embodiments, other portions of the support ring structure 202 may be heat-treated and/or tempered in addition to or as an alternative to the clamping portion being heat-treated, including, but not limited to, the bearing portion, a lower surface portion, an upper surface portion, or the like.

In an embodiment, the support ring structure 202 may be heat-treated during brazing of the superhard bearing elements 210 to the support ring structure 202. In other words, the heat-treating process may at least partially melt the braze alloy used to braze the superhard bearing elements 210 to the support ring structure 202 along with heat-treating the alloy that forms the support ring structure 202. For example, any of the braze alloys disclosed herein may be used to braze the superhard bearing elements 210 to the support ring structure 202. For example, as the superhard bearing elements 210 are brazed to the support ring structure 202, the temperature of the clamping portion, the bearing portion, combinations thereof, or other portions of the support ring structure 202 may be manipulated to form different crystalline structures, such as martensite, pearlite, austenite, or the like within the support ring structure 202. As desired, the different crystalline structures within the different portions to the support ring structure 202 may exhibit varying levels of yield strength, hardness, toughness, combinations thereof, or other properties within the support ring structure 202.

In another embodiment, the support ring structure 202 may be formed using powder metallurgy processes to exhibit varying levels of toughness, hardness, yield strength, or combinations thereof in different portions of the support ring structure 202. For example, the clamping portion of the support ring structure 202 may be formed with a first set of powdered materials to produce a relatively hard, high yield strength alloy material in the clamping portion. The bearing portion of the support ring structure 202 may be formed with a second set of powdered materials to produce relatively tougher, lower strength alloy material in the bearing portion. In an embodiment, the first powdered materials and the second powdered materials may be substantially the same and different crystalline structures may be achieved using different treatments and/or manufacturing techniques such as powder compaction, sintering, metal injection molding, tempering, continuous powder processing, combinations thereof, or the like. In other embodiments, the first set of powdered materials and the second set of powdered materials may be different and different crystalline structures and composition may be achieved based generally on the physical characteristics of the powdered materials themselves.

Figure 3:
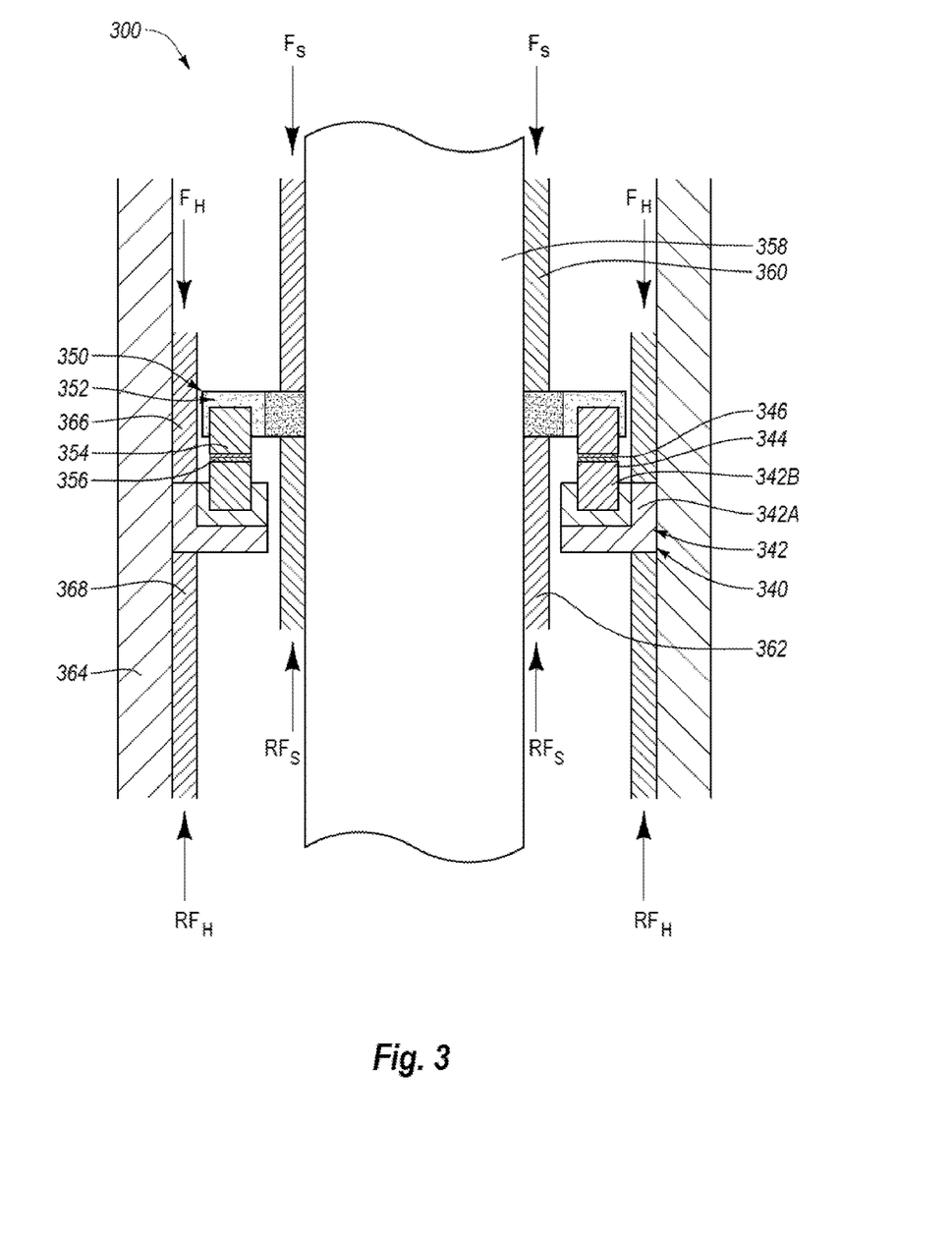
FIG. 3 is a partial isometric view of a thrust-bearing apparatus that may employ any of the disclosed thrust-bearing assemblies according to an embodiment.

Any of the above-described thrust-bearing assembly embodiments may be employed in a thrust-bearing apparatus. FIG. 3 is an isometric view of a thrust-bearing apparatus 300. The thrust-bearing apparatus 300 may include a stator 340. The stator 340 may be configured as the thrust-bearing assembly 100 or any other thrust-bearing assembly disclosed herein. The stator 340 may include a support ring structure 342 and a plurality of circumferentially-adjacent superhard bearing elements 344, with each of the superhard bearing elements 344 having a bearing surface 346. The stator may include a carrier 342A and a support ring 342B at least partially received within the carrier 342A. In an embodiment, the carrier 342A may be configured similar to the carrier 106 and exhibit a higher stiffness, hardness and/or higher yield strength properties. In an embodiment, the support ring 342B may be configured similar to the support ring 108 and may exhibit fracture toughness, stiffness, and/or lower yield strength properties.

The thrust-bearing apparatus 300 further may include a rotor 350. The rotor may be configured as the thrust-bearing assembly 200 or any other thrust-bearing disclosed herein. The rotor 350 may include a support ring structure 352 and a plurality of superhard bearing elements 354 mounted or otherwise attached to the support ring structure 352, with each of the superhard bearing elements 354 having a bearing surface 356 opposite the bearing surfaces 346. In an embodiment, similar to the support ring structure 202, the support ring structure 352 may include a clamping portion having a harder, higher yield strength crystalline structure and a bearing portion having a higher fracture toughness, lower yield strength crystalline structure.

As shown, a shaft 358 may be coupled to the support ring structure 352 and operably coupled to an apparatus capable of rotating the shaft, such as a downhole motor. For example, the shaft 358 may extend through and may be secured to the support ring structure 352 of the rotor 350 by press-fitting or threadly coupling the shaft 358 to the support ring structure 352 or another suitable technique. To hold the rotor 350 in place, one or more shaft clamping members 360 may exert clamping loads $F_S$ on the clamping portion of the support ring structure 352 as illustrated in FIG. 3. A flange portion 362 of the shaft 358 may exert reaction loads $RF_S$ on the support ring structure 352 opposite the clamping loads $F_S$. In an embodiment, the reaction loads $RF_S$ may be substantially equal the clamping loads $F_S$.

A housing 364 may be secured to the support ring structure 342 of the stator 340 and may extend circumferentially about the shaft 358 and the rotor 350. To hold the stator in place, one or more housing clamping members 366 may exert clamping loads $F_H$ on a clamping portion of the carrier 342A of the support ring structure 342 as shown. A flange portion 368 of the housing 364 may exert reaction loads $RF_H$ on a lower surface of the carrier 342A opposite the clamping loads $F_H$. In an embodiment, the reaction loads $RF_H$ may be substantially equal the clamping loads $F_H$.

In operation, friction, heat and thrust-loads may be generated between the bearing surfaces 346 of the stator 340 and the bearing surfaces 356 of the rotor 350. Similar to the supporting ring structures 102 and 202, the support ring structure 352 may include a bearing portion exhibiting material properties (i.e., fracture toughness, stiffness, lower yield strength) configured to increase compliance of the support ring structure 352. Likewise, the support ring structure 342 may also include a bearing portion exhibiting material properties configured to withstand stresses in the support ring structure 342 due to friction, heat loads, thrust-loads, and the like experienced by the support ring structure 342. Moreover, like the support rings 102 and 202, the support rings 342, 352 may include the clamping portions exhibiting material properties (i.e., hardness, high yield strength) configured to reduce deformation of the support rings structures 342, 352 under the clamping loads $F_H$, $RF_H$, $F_S$, and/or $RF_S$.

It is noted that in other embodiments, the rotor or stator may be configured as any of the previously described embodiments of thrust-bearing assemblies.

Figure 4:
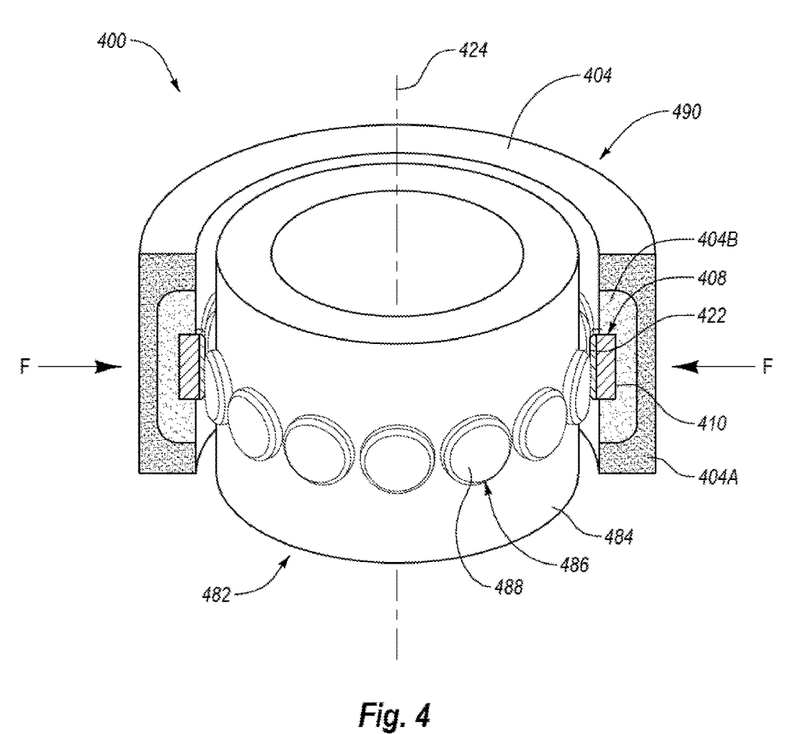
FIG. 4 is an isometric cutaway view of a radial bearing apparatus 400 according to an embodiment.

The concepts used in the thrust-bearing assemblies and apparatuses described above may also be employed in radial bearing assemblies and apparatuses. For example, FIG. 4 is an isometric cutaway view of a radial bearing apparatus 400 according to an embodiment. The radial bearing apparatus 400 may include a first radial bearing assembly or an inner race 482 (i.e., a rotor) and a second radial bearing assembly or an outer race 490 (i.e., a stator).

The inner race 482 may include a support ring structure 484 extending about a rotation axis 424. A plurality of superhard bearing elements 486 may be distributed circumferentially about the rotation axis 424 in corresponding recesses (not shown) formed in the support ring structure 484 and arranged in a single row. In other embodiments, the superhard bearing elements 486 may be circumferentially distributed in two rows, three rows, four rows, or any number of suitable rows. Each of the superhard bearing elements 486 may include a convexly-curved bearing surface 488.

The outer race 490 may include a support ring structure 404 extending about and receiving the inner race 482. A plurality of superhard bearing elements 408 may be distributed circumferentially about the rotation axis 424 in corresponding recesses 410 formed in the support ring structure 404 and arranged to correspond to the superhard bearing elements 486. Each of the superhard bearing elements 408 may include a concavely-curved bearing surface 422 curved to correspond to the convexly-curved bearing surfaces 488. The superhard bearing elements 408 and 486 may have a generally oval or other suitable shape and each may be made from any of the materials discussed above for the superhard bearing elements 108. In other embodiments, the superhard bearing elements 408 and 486 may have a generally wedge-like shape, a generally rounded rectangular shape, or any other suitable shape. The terms "rotor" and "stator" refer to rotating and stationary components of the radial bearing apparatus 400, respectively. Thus, if the outer race 490 is configured to remain stationary, the outer race 490 may be referred to as the stator and the inner race 482 may be referred to as the stator.

As shown, clamping loads F may be exerted in a clamping portion 404A of the support ring structure 404 substantially adjacent an outer surface thereof to clamp the outer race 490 in place during use with a drilling system or other mechanical system. In addition to the clamping loads F, the support ring structure 404 may also experience thermal loads, mechanical loads, combinations thereof, or other operational loads in a bearing portion 404B of the support ring structure 404 adjacent the inner surface of the support ring structure 404 surrounding the superhard bearing elements 408. In an embodiment, the support ring structure 484 may experience similar loads and conditions. For example, a clamping portion of the support ring structure 484 may be positioned substantially adjacent an inner surface of the support ring structure 484. Moreover, a bearing portion of the support ring structure 484 may be positioned adjacent an outer surface of the support ring structure 484 surrounding the superhard bearing elements 486.

The support ring structure 404 and/or the support ring structure 484 may include different portions configured to increase compliance of the support ring structures 404, 484 and/or withstand stresses in the support ring structures 404, 484. For example, the support ring structure 404 may be treated and/or manufactured to exhibit a higher yield strength and/or greater hardness in the clamping portion 404A of the support ring structure 404 than the bearing portion 404B. The support ring structure 404 may also be treated to exhibit a greater fracture toughness and/or lower yield strength in the bearing portion 404B of the support ring structure 404 than the clamping portion 404A. In other embodiments, the clamping portion 404A and/or the bearing portion 404B of the support ring structure 404 may be treated and/or manufactured to exhibit other physical and/or material properties such as hardness, melting points, thermal expansion coefficients, electrical resistivity, coefficients of friction, and the like. Similar to the description with respect to the support ring structure 202, treatments and/or manufacturing methods of the support ring structure 404 or the support ring structure 484 may include heat-treatments, surface treatments, nitriding, plasma treatments, chemical treatments, power metallurgy, metal injection molding, combinations thereof, or other treatments and/or manufacturing methods.

Figure 5:
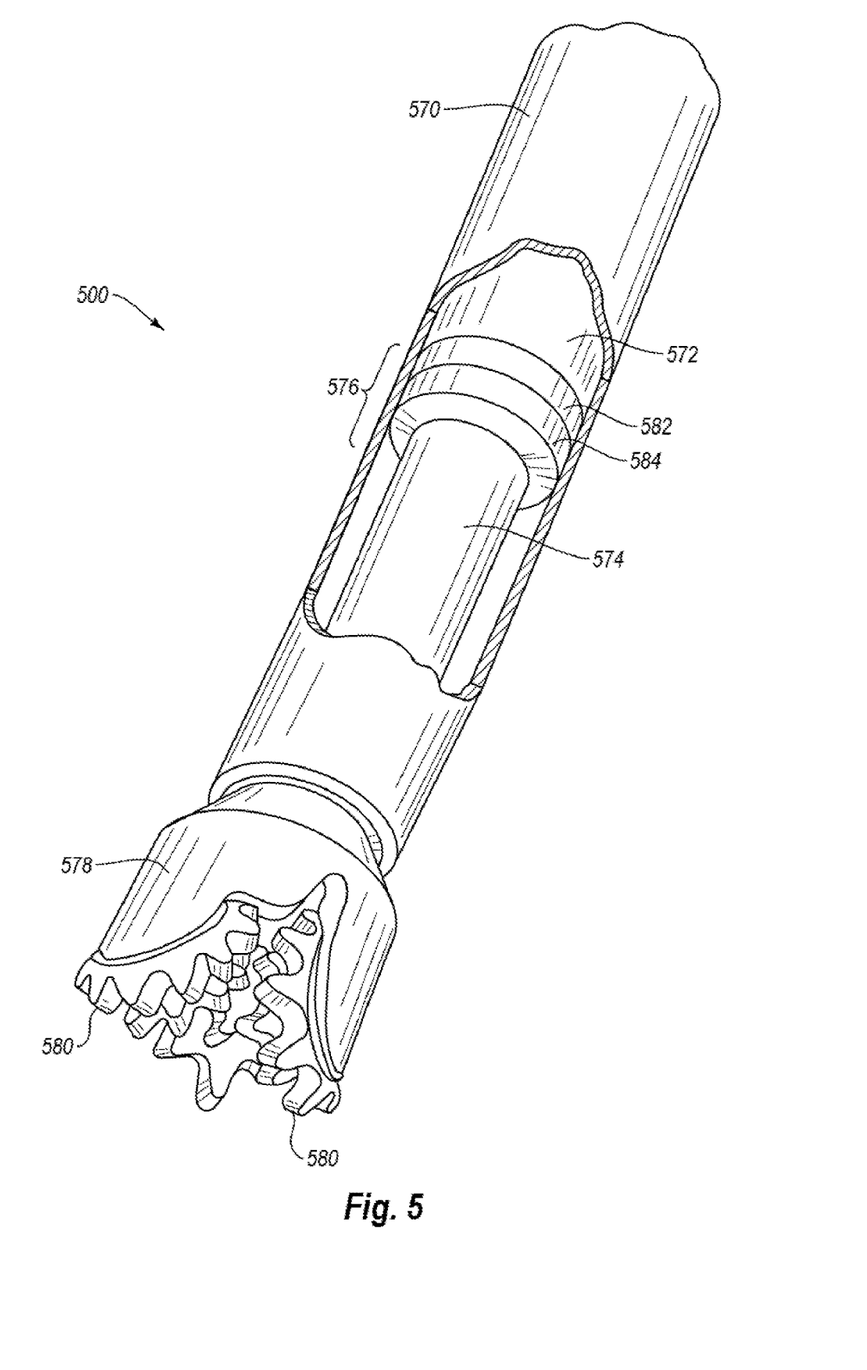
FIG. 5 is a schematic isometric cutaway view of a subterranean drilling system including a thrust-bearing apparatus utilizing any of the disclosed bearing assemblies according to various embodiments.

Any of the embodiments for bearing apparatuses discussed above may be used in a subterranean drilling system. FIG. 5 is a schematic isometric cutaway view of a subterranean drilling system 500 according to an embodiment. The subterranean drilling system 500 may include a housing 570 enclosing a downhole drilling motor 572 (i.e., a motor, turbine, or any other device capable of rotating an output shaft) that may be operably connected to an output shaft 574. A thrust-bearing apparatus 576 may be operably coupled to the downhole drilling motor 572. The thrust-bearing apparatus 576 may be configured as any of the previously described thrust-bearing apparatus embodiments. A rotary drill bit 578 may be configured to engage a subterranean formation and drill a borehole and may be connected to the output shaft 574. The rotary drill bit 578 is shown as a roller cone bit including a plurality of roller cones 580. However, other embodiments may utilize different types of rotary drill bits, such as so-called "fixed cutter" drill bits. As the borehole is drilled, pipe sections may be connected to the subterranean drilling system 500 to form a drill string capable of progressively drilling the borehole to a larger or greater depth within the earth.

The thrust-bearing apparatus 576 may include a stator 582 that does not rotate and a rotor 584 that may be attached to the output shaft 574 and rotates with the output shaft 574. As discussed above, the thrust-bearing apparatus 576 may be configured as any of the embodiments disclosed herein. One or more clamping members (not shown) may be configured to hold the stator 582 and/or the rotor 584 in place relative to the housing 570 and/or the output shaft 574. The stator 582 may include a plurality of circumferentially-distributed superhard bearing elements (not shown) similar to those shown and described in the thrust-bearing assembly 100 of FIG. 1A. The rotor 584 may also include a plurality of circumferentially-distributed superhard bearing elements (not shown) such as those shown and described in the thrust-bearing assembly 100 of FIG. 1A. Support ring structures of the rotor 584 and/or the stator 582 may also be configured similar to the support rings structures 102, 202 or any other support ring structures disclosed herein.

In operation, lubricating fluid may be circulated through the downhole drilling motor 572 to generate torque and effect rotation of the output shaft 574 and the rotary drill bit 578 attached thereto so that a borehole may be drilled. When the rotor 584 is rotated, thermal and mechanical loads may be exerted on the rotor 584 and the stator 582. The support ring structure of the rotor 584 and/or the stator 582 may include bearing portions configured to accept the thermal and mechanical loads exerted thereon and other operational conditions, as previously discussed. The support ring structures of the rotor 584 and/or the stator 582 may further include clamping portions configured to reduce deformation of the rotor 584 and/or the stator 582 under the clamping loads applied by the one or more clamping members.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method for manufacturing a bearing assembly, the method comprising:
    brazing a plurality of superhard bearing elements to a support ring structure having a first portion and a second portion; and
    controlling a first temperature of at least the first portion during the brazing process to cause the first portion to exhibit a first yield strength upon cooling; and
    controlling a second temperature of at least the second portion during the brazing process to cause the second portion to exhibit a second yield strength upon cooling, wherein the first yield strength is greater than the second yield strength.

2. The method of claim 1 wherein controlling the first temperature of the first portion further causes the first portion to exhibit a first fracture toughness, and wherein controlling the second temperature of the second portion further causes the second portion to exhibit a second fracture toughness, the second fracture toughness being greater than the first fracture toughness.

3. The method of claim 1 wherein the plurality of superhard bearing elements are secured to the second portion of the support ring structure and are separated from the first portion by the second portion.

4. The method of claim 3 wherein each of the plurality of the superhard bearing elements includes a bearing surface projecting out of the second portion.

5. The method of claim 1 wherein controlling the temperature in the first portion causes the first yield strength to exhibit a yield strength gradient that progressively decreases towards the second portion.

6. The method of claim 1 wherein controlling the temperature in the first portion causes the first yield strength of the first portion to be about 125 ksi to 250 ksi.

7. The method of claim 1 wherein controlling the temperature in the second portion causes the second yield strength of the second portion to be about 65 ksi to 125 ksi.

8. The method of claim 1 wherein the controlling the first temperature and controlling the second temperature causes the first and second portion to exhibit at least one of different melting points, different thermal expansion coefficients, different electrical resistivity, different coefficients of friction, different thermal conductivities, or different hardness.

9. A method for manufacturing a bearing assembly, comprising:
    forming a support ring structure having a carrier and a support ring at least partially disposed within the carrier, the carrier exhibiting a first fracture toughness and the support ring exhibiting a second fracture toughness which is greater than the first fracture toughness, the support ring having a plurality of recesses formed therein; and
    mounting a plurality of superhard bearing elements at least partially within corresponding ones of the plurality of recesses of the support ring.

10. The method of claim 9 wherein the carrier exhibits a first yield strength and wherein the support ring exhibits a second yield strength, wherein the carrier yield strength is greater than the support ring yield strength.

11. The method of claim 9 wherein the carrier includes at least one of tungsten carbide, titanium alloy, or a high-strength steel.

12. The method of claim 9 wherein the support ring includes at least one of low carbon steel, stainless steel, aluminum alloys, or iron.

13. The method of claim 9 wherein each of the plurality of superhard bearing elements includes a bearing surface that protrudes from the support ring.

14. The method of claim 13 wherein each of the plurality of superhard bearing element includes a bottom surface separated from the carrier by the support ring.

15. The method of claim 9, further comprising securing the support ring to the carrier using at least one of brazing, welding, press-fitting, threadedly attaching, fastening with a fastener, or a locking mechanism.

16. The method of claim 9 wherein the carrier and the support ring exhibit at least one of different melting points, different thermal expansion coefficients, different electrical resistivity, different coefficients of friction, different thermal conductivities, or different hardness.

* * * * *